US007277454B2

(12) United States Patent
Mocek et al.

(10) Patent No.: US 7,277,454 B2
(45) Date of Patent: Oct. 2, 2007

(54) ARBITRATION OF COMMUNICATION CHANNEL BANDWIDTH

(75) Inventors: Darryl J. Mocek, San Jose, CA (US); Terrence Barr, Cupertino, CA (US); Peter Strarup Jensen, Fremont, CA (US); William F. McWalter, Stirling (GB); Shahriar Vaghar, San Jose, CA (US); Behfar Razavi, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1071 days.

(21) Appl. No.: 10/105,121

(22) Filed: Mar. 22, 2002

(65) Prior Publication Data

US 2003/0179773 A1 Sep. 25, 2003

(51) Int. Cl.
*H04J 3/16* (2006.01)
(52) U.S. Cl. .................. 370/468; 370/437; 370/465
(58) Field of Classification Search ............ 370/458, 370/461, 462, 463, 468
See application file for complete search history.

(56) References Cited

U.S. PATENT DOCUMENTS

| 6,188,699 | B1 * | 2/2001 | Lang et al. ................ 370/463 |
| 6,226,265 | B1 * | 5/2001 | Nakamichi et al. ......... 370/235 |
| 6,289,019 | B1 * | 9/2001 | Dieudonne ................ 370/395.3 |
| 6,611,531 | B1 * | 8/2003 | Chen et al. ................. 370/458 |
| 6,785,252 | B1 * | 8/2004 | Zimmerman et al. ....... 370/337 |
| 6,829,647 | B1 * | 12/2004 | Biran et al. ................ 709/229 |
| 2002/0001288 | A1 * | 1/2002 | Fukunaga et al. .......... 370/252 |
| 2002/0098840 | A1 * | 7/2002 | Hanson et al. ............. 455/435 |
| 2002/0159434 | A1 * | 10/2002 | Gosior et al. .............. 370/350 |
| 2004/0213197 | A1 * | 10/2004 | Zimmerman et al. ....... 370/346 |
| 2007/0038759 | A1 * | 2/2007 | Hanson et al. ............. 709/227 |

* cited by examiner

*Primary Examiner*—Phirin Sam
(74) *Attorney, Agent, or Firm*—Martine Penilla & Gencarella LLP

(57) ABSTRACT

A method for arbitrating channel bandwidth among a plurality of logical connections desiring access over a communication channel to transmit data is provided. The method includes detecting a connection desiring access through the communication channel and assigning the connection to a group having arbitration parameters. Then, the method packetizes the data to be transmitted and transmits each packet of the data in time slices. In each time slice, data is transmitted using the arbitration parameters of the group.

21 Claims, 12 Drawing Sheets

ARBITRATION OF COMMUNICATION CHANNEL BANDWIDTH

CROSS REFERENCE TO RELATED APPLICATIONS

This application is related to (1) U.S. patent application Ser. No. 10/104,267, filed Mar. 22, 2002, and entitled "Adaptive Connection Routing Over Multiple Communication Channels," (2) U.S. patent application Ser. No. 10/104,351, filed Mar. 22, 2002, and entitled "System and Method for Distributed Preference Data Services," (3) U.S. patent application Ser. No. 10/104,297, filed Mar. 22, 2002, and entitled "Asynchronous Protocol Framework," (4) U.S. patent application Ser. No. 10/104,298, filed Mar. 22, 2002, and entitled "Business-Model Agnostic Service Deployment Management Service," (5) U.S. patent application Ser. No. 10/104,295, filed Mar. 22, 2002, and entitled "Manager Level Device/Service Arbitrator," (6) U.S. patent application Ser. No. 10/104,246, filed Mar. 22, 2002, and entitled "Java Telematics System Preferences," (7) U.S. patent application Ser. No. 10/104,243, filed Mar. 22, 2002, and entitled "System and Method for Testing Telematics Software," (8) U.S. patent application Ser. No. 10/104,860, filed Mar. 22, 2002, and entitled "System and Method for Simulating an Input to a Telematics System," (9) U.S. patent application Ser. No. 10/104,294, filed Mar. 22, 2002, and entitled "Java Telematics Emulator," and (10) U.S. patent application Ser. No. 10/104,245, filed Mar. 22, 2002, and entitled "Abstract User Interface Manager with Prioritization," which are incorporated herein be reference.

BACKGROUND OF THE INVENTION

1. Field of the Invention

This invention relates generally to software for facilitating communication between client software and server software, in an environment where the client is communicating with the server over one or more wireless communication channels.

2. Description of the Related Art

The electronic content and sophistication of automotive designs has grown markedly. Microprocessors are prevalent in a growing array of automotive entertainment, safety, and control functions. Consequently, this electronic content is playing an increasing role in the sales and revenues of the automakers. The features provided by the electronic content include audio systems, vehicle stability control, driver activated power train controls, adaptive cruise control, route mapping, collision warning systems, security systems, etc. The significant increase of the electronic content of land based vehicles has concomitantly occurred with the explosive growth of the Internet and the associated data driven applications supplied through mobile applications.

Telematics, a broad term that refers to vehicle-based wireless communication systems and information services, promises to combine vehicle safety, entertainment, and convenience features through wireless access to distributed networks, such as the Internet. Telematics offers the promise to move away from the hardware-centric model from audio and vehicle control systems that are built into devices that are custom designed for each vehicle, to infotainment delivered by plug-and-play hardware whose functionality can be upgraded through software loads or simple module replacement. Furthermore, new revenue streams will be opened up to automobile manufacturers and service providers through the products and services made available through telematics.

Since these infotainment systems integrate entertainment and information within a common envelope, the systems need to be highly integrated, open, and configurable. However, the electronic systems currently on the market are custom designed for the make, model, year and world region in which the vehicle is sold. Additionally, the electronic systems being used today are linked by proprietary busses having severely limited bandwidth that are inadequate for data-intensive services combining information entertainment and safety. The proprietary and customized systems require a developer to know the underlying software and hardware application program interfaces (APIs) in order to develop applications for future infotainment systems. However, numerous proprietary and customized systems are spread across the various makes and models of the vehicles in the marketplace and even within the same model from year to year. Thus, the heterogeneous nature of the various systems essentially eliminates any benefits of economies of scale since equipment and software must be tailored to each model permutation.

Traditionally, vehicles use wireless connections to communicate with a base station or service provider. As the content available to telematics consumers increases in richness and complexity, a need for better bandwidth management has begun to surface. However, as most telematics-type systems are proprietary in nature, it is difficult to predict how particular devices will handle different communication bandwidth needs, or what types of applications can be written and still be supported.

In view of the forgoing, there is a need for methods to dynamically manage and assign access to communication channels used in wireless communication between a client application and a server application.

SUMMARY OF THE INVENTION

In one embodiment, a method for arbitrating channel bandwidth among a plurality of logical connections desiring access over a communication channel to transmit data is provided. The method includes detecting a connection desiring access through the communication channel and assigning the connection to a group having arbitration parameters. Then, the method packetizes the data to be transmitted and transmits each packet of the data in time slices. In each time slice, data is transmitted using the arbitration parameters of the group.

In another embodiment, a system for arbitrating channel bandwidth among a plurality of logical connections desiring access over a communication channel to transmit data is provided. The system includes a grouping mechanism for creating connection groups. Each connection group has specific arbitration parameters. An arbitrator for managing the arbitration parameters of each connection group is further provided. The arbitration parameters are configured to be updateable. A data multiplexer and flow controller is included for transmitting the data. The transmitting includes packetizing the data and sending packets in time slices, and for each connection and in each time slice, using to the specific arbitration parameters currently assigned to the connection group of the connection.

In yet another embodiment, a computer readable media containing program instructions for arbitrating channel bandwidth among a plurality of logical connections desiring access over a communication channel to transmit data is provided. The computer readable media includes: (a) program instructions for creating connection groups, and each connection group having specific arbitration parameters; (b)

program instructions for managing the arbitration parameters of each connection group, the arbitration parameters being updateable; and (c) program instructions for transmitting the data. The transmitting includes packetizing the data and sending packets in time slices. For each connection and in each time slice, using to the specific arbitration parameters currently assigned to the connection group of the connection.

In still another embodiment, a method for arbitrating channel bandwidth among a plurality of logical connections desiring access over a communication channel to transmit data is provided. The method includes creating connection groups. Each connection group will have specific arbitration parameters. The method further includes managing the arbitration parameters of each connection group, wherein the arbitration parameters are updateable. The method then includes transmitting the data. The transmitting includes packetizing the data and sending packets in time slices, and for each connection and in each time slice, using to the specific arbitration parameters currently assigned to the connection group of the connection.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

DETAILED DESCRIPTION OF THE PREFERRED EMBODIMENTS

Figure 1:
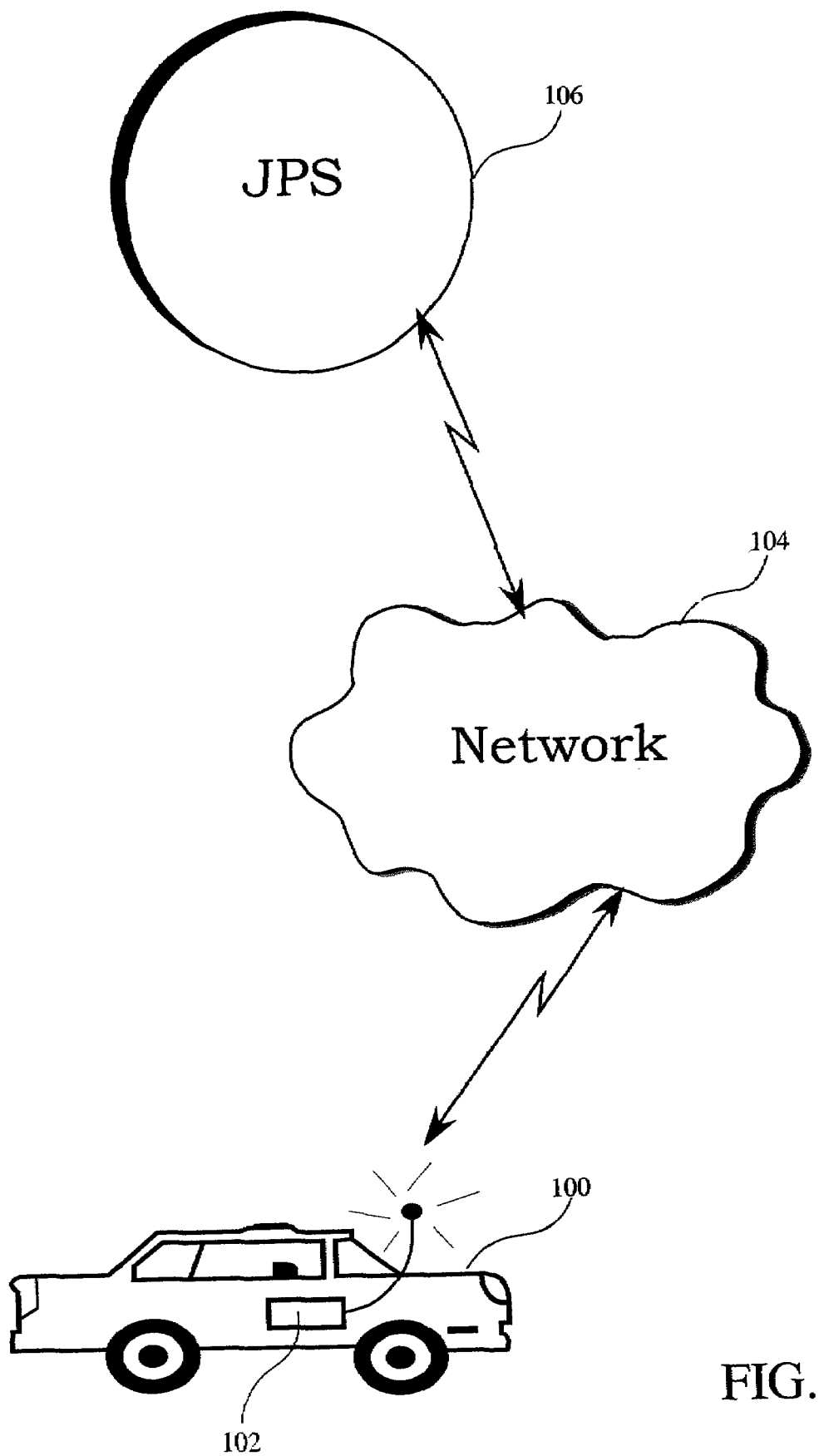
FIG. 1 is a high level schematic overview of an automotive telematics system in accordance with one embodiment of the invention.

An invention is disclosed for transparent arbitration of bandwidth of one or more communication channels, among logical groups of connections. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

A connection is a logical entity to exchange data between two endpoints on behalf of a user application. A connection requires a communication channel to actually transmit and receive data. More than one communication channel may be available or feasible at a given time, depending on factors such as coverage. In the case of wireless connection, cell modems may only be available in more densely populated areas, and higher throughput connections may only be available at designated areas, such as, services stations. In the case where the wireless device is integrated into an automobile, the automobile may have relatively good reception around town using a cell modem. However, when the vehicle approaches a service station, for example, the service station may provide higher bandwidth coverage. That is, if a subscription was in place by the vehicle owner to obtain higher bandwidth upon entry into designated transmission areas, the system in accordance with the invention would be able to automatically disconnect from the cell modem and reconnect to a higher bandwidth connection, such as an 802.11b wireless LAN standard connection.

Each channel has certain properties associated with it such as bandwidth, reliability, and cost, which influence the decision (policy) on how to use a particular channel over time. In one embodiment, a method is provided to enable intelligent connection routing over a dynamically changing set of communication channels so that a given policy is best fulfilled. For example, one policy might state to always route a connection over the communication channel with the greatest bandwidth while another policy might favor the lowest cost per amount of data transmitted.

However, the channel that is most favorable under a given policy might not be available at all times. In this case, the connection must be routed over a different, less-favorable communication channel until the more-favorable channel becomes available again. Accordingly, optimization in communication connectivity is achieved by balancing channel properties vs. a pluggable policy.

In a preferred embodiment, the method of the present invention is independent of the protocols used and will be applicable to all types of networking stacks. The method further enables re-routing of a connection to happen transparently to the user application, e.g., no intervention by it is required and the data transmitted is unaffected. Although the policy may include input from the user application, this input does not mean the actual rerouting of the connection is less transparent to the application.

An embodiment of the invention enables the change in connection routing dynamically (e.g., at runtime), and the change takes place based on the set policy for a given connection. Accordingly, the method does not mandate a specific policy but allows the policy to be defined independently according to the needs of the specific setup and can then be plugged into the method at deployment time.

In another embodiment of the present invention, a method is provided that will enable transparent arbitration of bandwidth of one or more communication channels, among logical groups of connections, with a pluggable arbitration policy and dynamically updateable arbitration parameters. In one aspect, logical connections desiring communication over a given channel must be arbitrated so that the appropriate bandwidth of a channel's limited bandwidth is assigned to each connection according to assigned arbitration parameters. These arbitration parameters can change over time, so any change in these parameters, whether they give a connection more bandwidth or less, is dynamically and transparently assigned to each connection. In one aspect of the present invention, logical groups of connection will be set up, where each group has a set of arbitration parameters. As connections get added, they are added to specific group using a grouping mechanism. Thus, all connections in a specific group share the bandwidth of the underlying channel. If a high priority connection gets added, it will be assigned to a group having arbitration parameters matching or closely matching the desired priority.

In one aspect of the present invention, the arbitration parameters of a group can be dynamically updated, resulting in a runtime change of the behavior of the arbitration. It should be noted that more than one group can be bound to a communication channel, and groups can be themselves grouped in supergroups, resulting in a hierarchical structure. There is exactly one root group bound to a communication channel and all subgroups share the bandwidth of that channel. Although emphasis is made, for purposes of example, to one communication channel, the methods of the present invention are applicable to more than one communication channel.

As will be explained in more detail below, the client side of a telematics system includes a telematics control unit (TCU) that ties into a vehicle system. In one embodiment, the TCU is associated with a user interface (UI) that provides a user with access to control options. It should be appreciated that the user can interact with the TCU through speech recognition, a mouse type device, touch pad or some other suitable mechanism which has a minimal impact on the driver's ability to drive. Of course, a passenger of the vehicle is not limited by the restrictions on the driver with respect to the interaction with the UI.

The TCU can tie into any of the control systems, safety systems, entertainment systems, information systems, etc., of the vehicle. It will be apparent to one skilled in the art that the client side stack of the TCU is utilized to access a vehicle interface component for accessing in-vehicle devices, such as the speedometer, revolutions per minute (rpm) indicator, oil pressure, tire pressure, etc. Thus, client side applications sitting in the TCU will allow for the functionality with respect to the vehicle systems as well as infotainment applications.

In one embodiment, the telematics system deploys Java technology. It should be appreciated that Java technology's platform-independence and superior security model provide a cross-platform solution for the heterogeneous systems of a vehicle while maintaining a security architecture protecting against viruses and unauthorized access. Thus, the content or service provider is insulated against the myriad of car platforms while vehicle manufacturers are protected against hacker threats. In addition, Java application program interfaces (APIs) are available to support telematics mediums, such as speech recognition through Java Speech API (JSAPI), media delivery through Java Media Framework (JMF) and wireless telephony through Wireless telephony communications APIs (WTCA), etc.

FIG. 1 is a high level schematic overview of an automotive telematics system in accordance with one embodiment of the invention. A client/server architecture relying on standards and principles of modular design allows for functionality of the telematics system to be delivered to the customer through wireless access. The server side includes Java provisioning server (JPS) 106 in communication with network 104. For a detailed description of JPS 106, reference may be made to U.S. patent application Ser. No. 10/104,297, entitled "Asynchronous Protocol Framework," and having inventors Peter Strarup Jensen, Pavel S. Veselov, Shivakumar S. Govindarajapuram, and Shahriar Vaghar, assigned to the assignee of the present application, and which is hereby incorporated by reference.

In one embodiment, the client side includes telematics control unit (TCU) 102 contained within a land based vehicle 100. Of course, the TCU's implementation is not limited to land based vehicles, and is equally applicable to boats, planes, hovercraft, space shuttles, etc., which are all recipients of the technology defined herein. TCU 102 is enabled to communicate with network 104 through wireless access. Of course, network 104 can be any distributed network such as the Internet and the wireless access protocol (WAP) can be any suitable protocol for providing sufficient bandwidth for TCU 102 to communicate with the network. It should be appreciated that the client/server architecture of FIG. 1 allows for the evolution from hard wired, self contained components to platform based offerings relying on software and upgrades. Thus, a service provider controlling JPS 106 can deliver an unbundled, open end-to-end solution enabling plug and play applications. For example, the service can be a tier-based service similar to home satellite and cable services. It will be apparent to one skilled in the art that an open platform, such as frameworks based on Java technology, enables a developer to create executable applications without regard to the underlying hardware or operating system.

Figure 2:
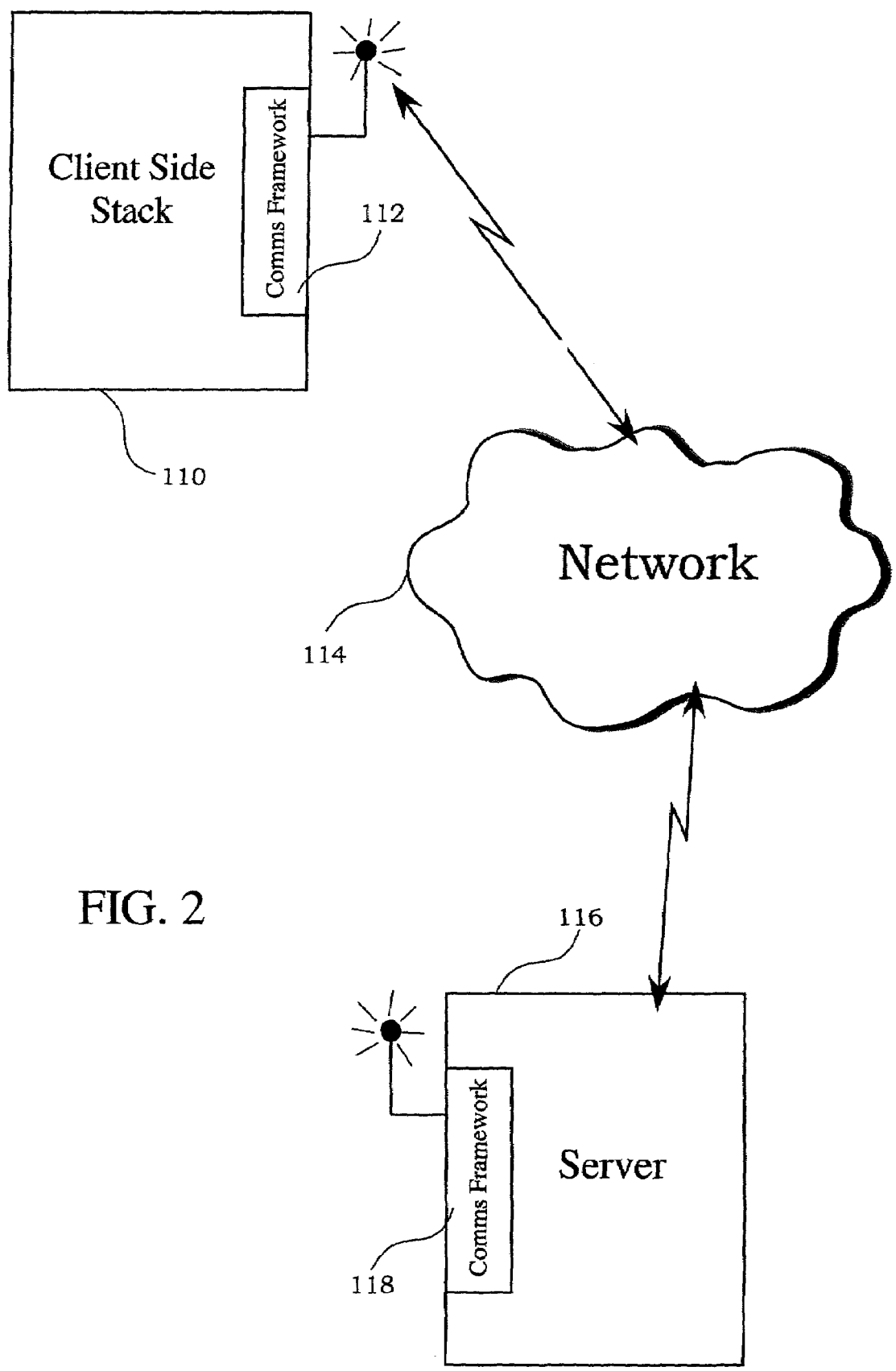
FIG. 2 is a schematic diagram of a telematics client communicating through a wireless network with a telematics server in accordance with one embodiment of the invention.

FIG. 2 is a schematic diagram of a telematics client communicating through a wireless network with a telematics server in accordance with one embodiment of the invention. Client side stack 110 includes the necessary layers for a client application, also referred to as a manager or a carlet, to be executed to provide functionality. As will be explained further below, the carlet has access to each layer of the client side stack 110. Included in client side stack 110 is client communication framework 112. Client communication framework 112 enables communication between the client side stack 110 and an application on server 116 through network 114.

It should be appreciated that server 116 is not limited to a wireless connection. For example, server 116 can be hard-wired into network 114. One skilled in the art will appreciate that where server 116 communicates through a wireless connection with network 114, the communication proceeds through server communication framework 118. With respect to an embodiment where server 116 is hard-wired to network 114, the server can communicate with network 114 through a network portal (e.g., the Internet) rather than server communication framework 118. Additionally, network 114 can be any suitable distributed network, such as the Internet, a local area network (LAN), metropolitan area network (MAN), wide area network (WAN), etc.

Figure 3:
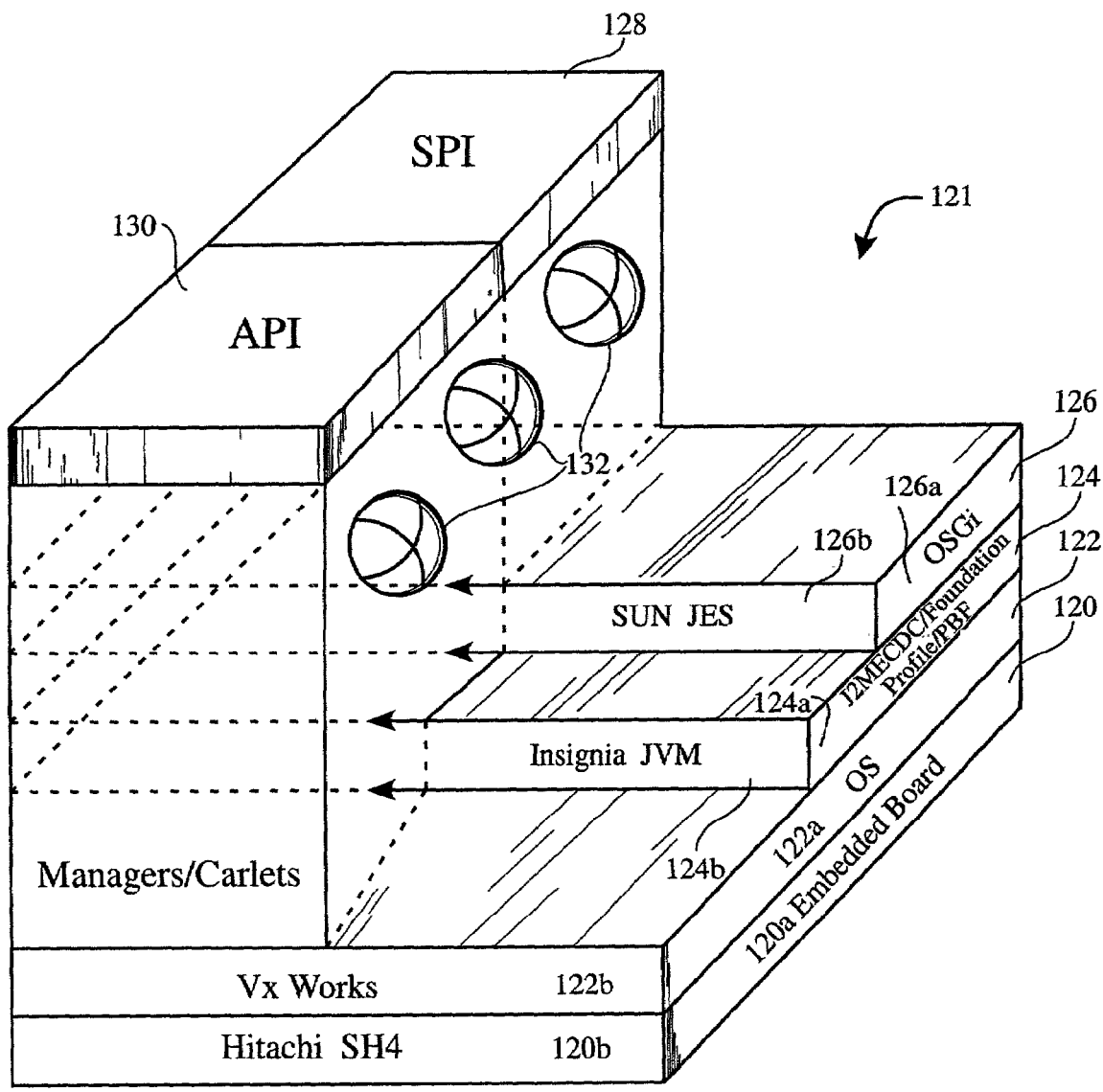
FIG. 3 is a three dimensional pictorial representation of a telematics client implementation of the client side stack of FIG. 2 in accordance with one embodiment of the invention.

FIG. 3 is a three dimensional pictorial representation of a telematics client implementation of the client side stack of FIG. 2 in accordance with one embodiment of the invention. Client side implementation 121 includes hardware layer 120 of the client includes an embedded board containing a telematics control unit (TCU). As mentioned with reference to FIG. 1, the TCU is incorporated into a land based vehicle. In one embodiment, the TCU is in communication with the electronic components of a vehicle through a vehicle bus or other means. These components include the measurement of vehicle operating and safety parameters, such as tire pressure, speed, oil pressure, engine temperature, etc., as well as information and entertainment components, such as audio system settings, internet access, environmental control within the cabin of the vehicle, seat positions, etc. One skilled in the art will appreciate that the telematics control unit is capable of integrating the functionality of various handheld information and entertainment (infotainment) devices, such as mobile phones, personal digital assistants (PDA), MP3 players, etc.

Still referring to FIG. 3, operating system layer 122 sits above hardware layer 120. Java virtual machine (JVM) layer 124 sits on top of operating system (OS) layer 122 and open services gateway initiative (OSGI) layer 126 sits on top of the JVM layer. It should be appreciated that the standard for JVM layer 124 includes Java 2 Platform Micro Edition (J2ME), Connected Device Configuration (CDC), Foundation Profile, Personal Profile, or Personal Basis Profile. One skilled in the art will appreciate that J2ME Foundation Profile is a set of APIs meant for applications running on small devices that have some type of network connection, while J2ME Personal Profile provides the J2ME environment for those devices with a need for a high degree of Internet connectivity and web fidelity.

The exemplary standards for each of the layers of the stack are provided on the right side of client side reference implementation 121. In particular, OSGI 126a, J2ME 124a, OS 122a, and embedded board 120a are standards and to the left of the standards are examples of actual products that implement the standards. For example, OSGI 126a standard is implemented by Sun's Java Embedded Server (JES) 2.1 126b, J2ME 124a standard is implemented by Insignia's Virtual Machine 124b, OS 122a is implemented by Wind River's VxWorks real time operating system 122b, and embedded board 120a is an embedded personal computer based board such as Hitachi's SH4. It should be appreciated that the actual products are exemplary only and not meant to be limiting as any suitable product implementing the standards can be utilized.

Carlets 132 of FIG. 3, have access to each layer above and including OS layer 122. Application program interface (API) layer 130 is the layer that carlets use to communicate with the JTC. Service provider interface (SPI) layer 128 is a private interface that managers have among each other. One skilled in the art will appreciate OSGI layer 126 provides a framework upon which applications can run. Additional functionality over and above the JVM, such as lifecycle management, is provided by OSGI layer 126. It should be appreciated that the open services gateway initiative is a cross-industry working group defining a set of open APIs for a service gateway for a telematics system. These APIs consist of a set of core framework APIs. In order to deploy services and their implementations, OSGi defines a packaging unit called a service bundle. A service bundle is a Java Archive (JAR) file containing a set of service definitions along with their corresponding implementation. Both infrastructure services and carlets are deployed as service bundles. Some of the functionality for arbitrating, controlling and managing devices and resources, e.g., speakers cell phones, etc., is provided by OSGI layer 126. However, one skilled in the art will appreciate that separate arbitration services may also be required.

As defined further below, a carlet is a Java™ application. For each function or task to be processed on the client side or between the client and server sides, a carlet is invoked to manage the operation.

Figure 4:
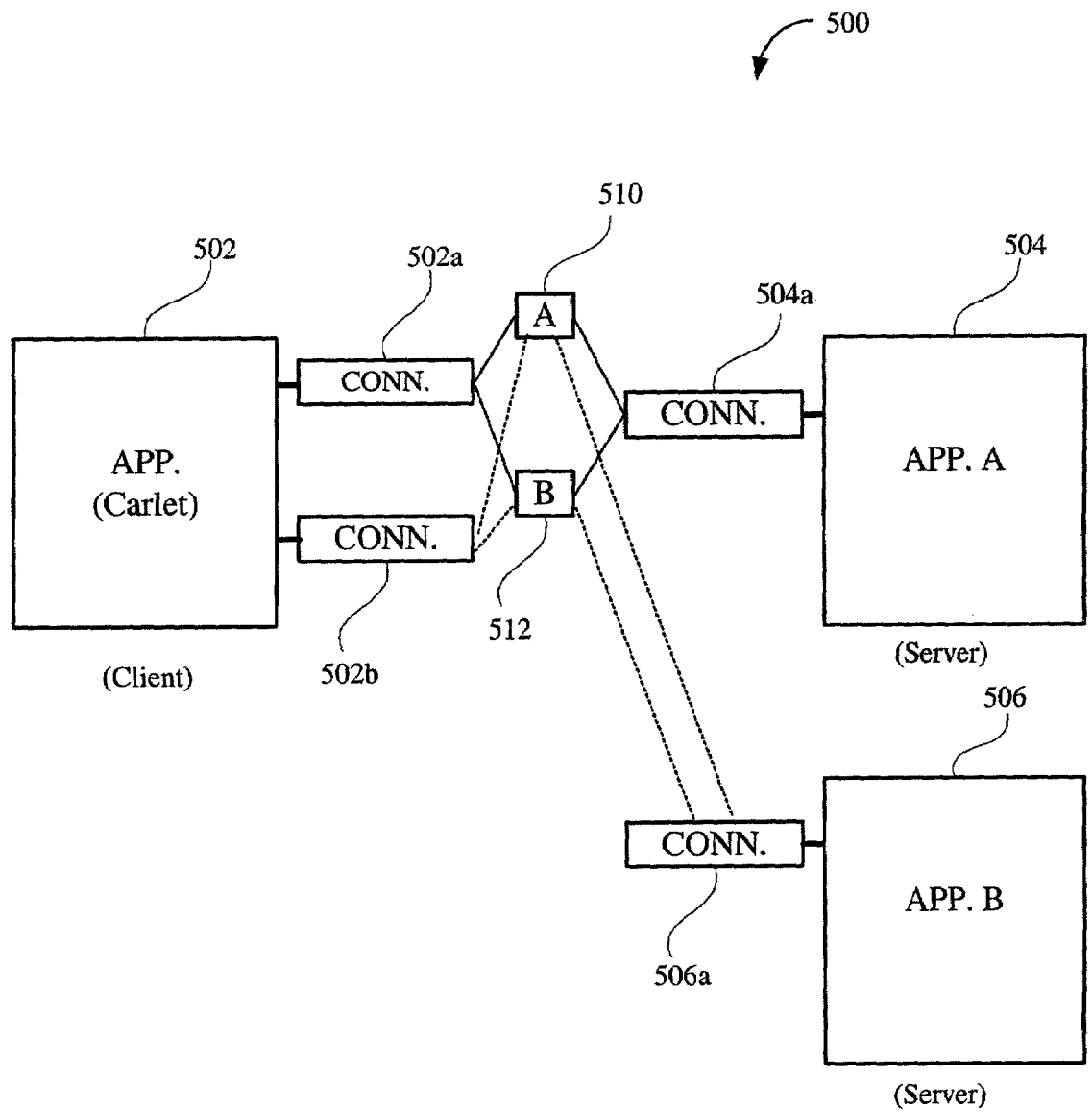
FIG. 4 illustrates exemplary logical connections between a client application and server applications over different channels.

FIG. 4 shows a block diagram of a communication system 500 in which a client side application 502 communicates with applications 504 and 506 of a server side. As discussed above, application 502 may be a carlet application, and application A (APP.A) and application B (APP.B) may be applications running on a server side of a system, such as the telematics system described above. Connections can be established between application 502 and application A 504 over a logical connection established between connection (CONN.) 502a and connection (CONN.) 504a. The logical connection between connection 502a and connection 504a is shown established over a physical channel A 510.

The same logical connection can be established between application 502 and application A 504 over a physical channel B 512. Physical channel A 510, in a wireless environment, may be a cell modem connection. Physical channel B 512 may be, for example, a connection utilizing standard 802.11b. As is well known, the IEEE 802.11b specification defines the protocol for wireless transmission of approximately 11 Mbps of raw data at distances from several dozen to several hundred feet over the 2.4 GHz unlicensed band. Generally speaking, 802.11b is an extension of Ethernet to wireless communication, and is primarily used for TCP/IP, but can also handle other forms of networking traffic. Thus, a wireless connection over standard 802.11b is substantially faster than a connection over a cell modem (e.g., providing a greater bandwidth).

Another channel may provide Bluetooth communication. Bluetooth is the name given to a technology standard using short-range radio links, intended to replace the cable(s) connecting portable and/or fixed electronic devices. This technology offers wireless access to LANs, PSTN, the mobile phone network and the internet for a host of home appliances, portable handheld devices, and vehicle telematics devices. Of course, the type of wireless connection is not important, as is the ability to seamlessly and adaptively switch between available channels, while making it transparent to the user application.

Referring to FIG. 4, a connection can also be established between logical connections 502b and 504a to application A 504 over any one of physical channels A 510, physical channel B 512, physical channel N, etc. The same logic applies when a connection is established between application 502 on the client side with application B 506 on the server side. In one embodiment, application 502 will be capable of selecting the most appropriate channel to achieve the quality of service desired for communication between the client and the server. This is true even though channels A 510 and channel B 512 may utilize different network level communication protocols, thus achieving true network protocol independence.

To achieve the foregoing, a communication framework API is provided to enable communication between the client application (carlet) 502 and an application on the server side over a logical connection by selecting the most appropriate, or most efficient communication channel as dictated by a policy. In the communications framework, logic is provided to enable selection between available channels to satisfy a policy set by the user application to achieve the communication quality of service (QoS) desired for a particular application. For instance, if the carlet application 502 were an MP3 media player, and downloading of MP3 music files is an object of the carlet application 502, then the policy may dictate that communication may only occur over a given type of channel, such as an 802.11b channel. If the desired channel were not available, then no connection would be initiated. In another embodiment, upon detecting the availability of the 802.11 channel, the connection would be established for the carlet.

Figure 5:
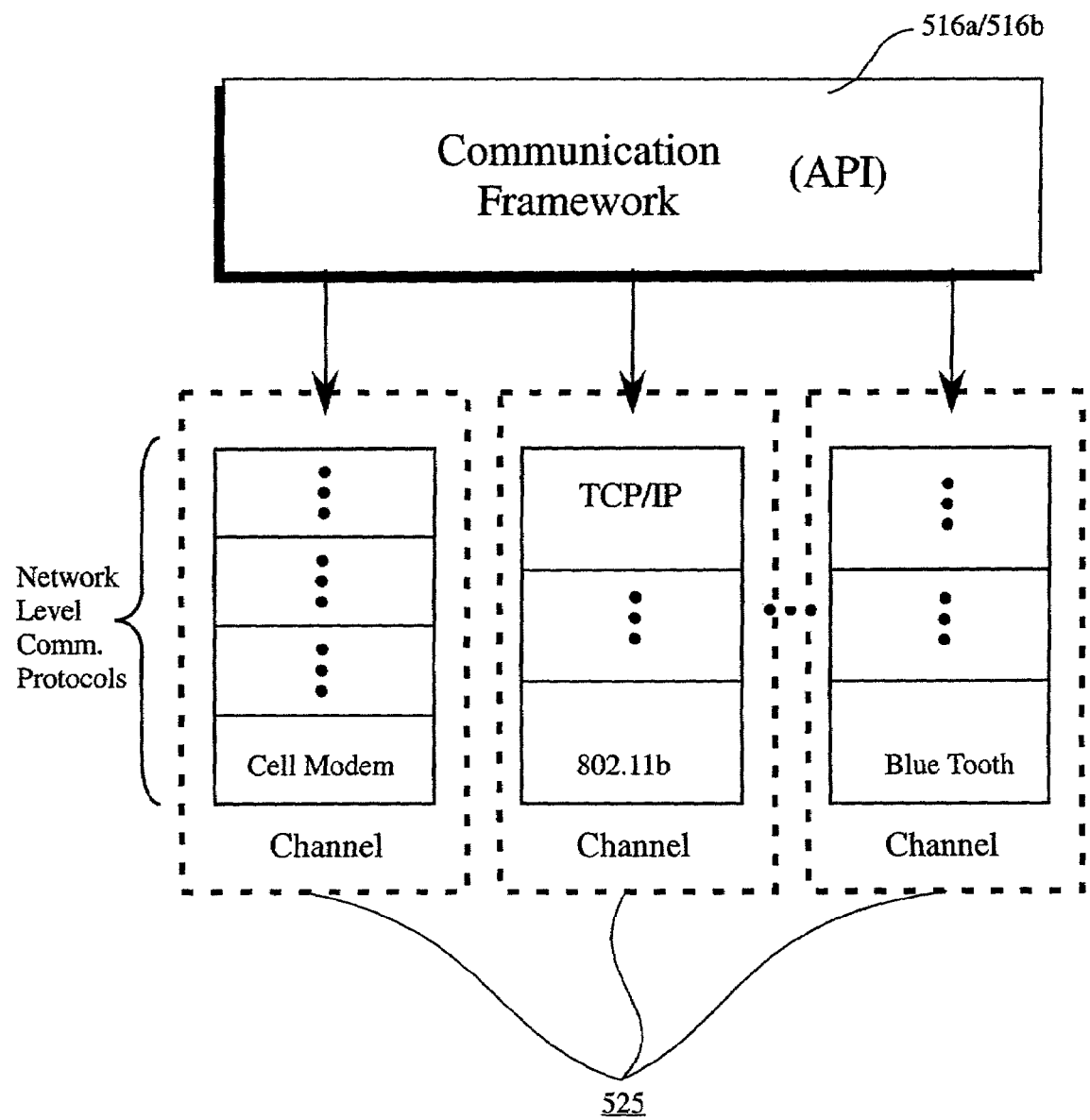
FIG. 5 is a block diagram showing the communication framework API capable of interfacing with disparate communication channels, in accordance with one embodiment of the present invention.

FIG. 5 illustrates a more detailed diagram of the communication's framework (API) 516a/516b. The communication's framework is designed to enable selection between different channels 525 having different network level communication protocols. Accordingly, the communication framework 516 is designed to enable intelligent selection of a given channel to achieve the quality of service desired by the user application (or as defined in the policy). FIG. 5 is simply provided to illustrate how the communications framework (API) 516a/516b is truly independent of the underlying networking protocol. As such, a connection over any one channel will be transparent to the carlet on the client side and the application on the server side. Although TCP/IP is illustrated as an example, it should be understood that the preferred embodiments of the present invention may use any protocol implementation.

Figure 6:
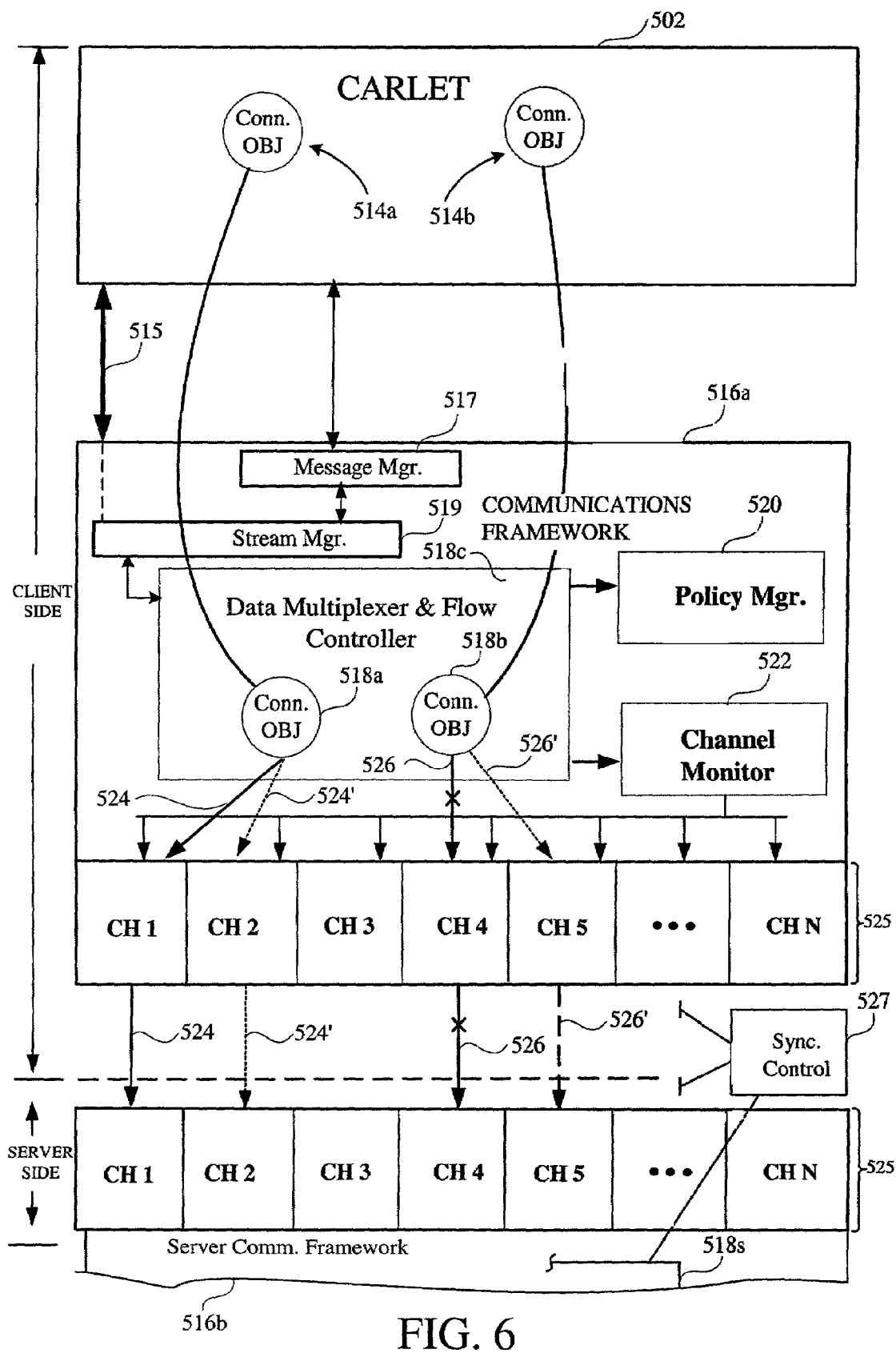
FIG. 6 illustrates an exemplary connection between one carlet (client application) and a server using the communications framework of the present invention.

FIG. 6 illustrates communication between a carlet application 502 and the communications framework 516a on the client side. For purposes of simplicity, the detailed components of the communications framework 516a is only shown from the perspective of the client side, although it should be understood that the server side has a similar communication framework 516b to establish and enable synchronous communication between the client side (e.g., a telematics control unit on a vehicle) and the server side (e.g., a Java telematics server). The telematics java provisioning server is charged with communicating with any number of clients. Such clients may be from any number of vehicles, makes, models, etc, while the client side is specific to a particular vehicle and TCU implementation.

The communications framework 516a will include a message manager 517, a stream manager 519, a data multiplexer and flow controller 518c (i.e., to function as a data pump), a policy manager 520, a channel monitor 522, and an interface to the various physical channels available to the communications framework of the client side. A synchronization control 527 is provided to interface between the client side and the server side. Specifically, the synchronization control 527 will enable communication between the data multiplexer and flow controller 518c of the client side, and the data multiplexer and flow controller 518s of the server side.

In operation, when a particular carlet application 502 is requested, the carlet will communicate 515 with the stream manager 519 and request that a connection be established. In the request, the carlet, in one embodiment, will provide properties detailing what type of connection is needed to satisfy the carlet's bandwidth requirements. As noted above, if the carlet is an MP3 carlet, the properties may designate a particular minimum transfer rate. In response, the stream manager 519 will request a connection object (Conn. OBJ) 518a from the data multiplexer and flow controller 518c. If a channel satisfying the desired bandwidth is available, the data multiplexer and flow controller 518c will return a connection object (Conn. OBJ) 514a back to the carlet. The message manager 517 provides message-based communication, where messages are discrete entities of data (as opposed to a continuous stream of data in a stream connection). In general, messages can be sent and received in both directions, in a synchronous and/or asynchronous manner. Actual transmission of messages might occur over a stream-oriented channel or a message-oriented channel (such as SMS, etc).

Accordingly, a communication link will be established between the carlet application 502 via the connection objects 514a and 518a of the data multiplexer and flow controller 518c. In one embodiment, the connection object 518a of the data multiplexer and flow controller 518c has the ability to switch between channels 525 that are available to the communications framework 516a of the client side. For instance, the data multiplexer and flow controller connection object 518a may initially establish a connection 524 to a channel 1 (CH 1). Connection 524 will thus communicate with a L complementary channel 1 (CH 1) of the server side. The policy manager 520, is preferably a pluggable policy that can be custom tailored for the particular application or based on user specifications. For instance, the policy manager may contain code that will enable selection of different channels depending upon availability, the type of communication desired, bandwidth requirements for a given data transfer or transfers, payment of a bandwidth fee, subscription level, etc.

Assume in one example that the connection objects 514a and 518a have been established and are enabling data flow over connection 524 through channel 1. At some point in time, possibly when the client (e.g., a vehicle with a telematics control unit) enters a zone of higher bandwidth (e.g., such as a gas station with high wireless bandwidth services), channel 2 (CH 2) will become available. Its availability is detected by the channel monitor 522 of the communications framework 516a. If channel 2 is more desirable than channel 1, based on the policy set by the policy manager 520, the connection object 518a will initiate a switch to channel 2.

The switch to channel 2 will then be synchronized using the synchronization control 527, such that data being transferred between the client side and the server side achieve synchronization (i.e., thus preventing data loss during the switch). For instance, the data flow over connection 524 may be stopped causing a backup at the carlet application side. Any data still in the process of being transferred over channel 1 would be allowed to complete before allowing the connection object 518a to switch to channel 2. This synchronization between the client side and server side will enable channel switching, while preventing loss of data. Accordingly, once the connection object 518a has established synchronization between the client side and the server side, and the connection object 518a has switched from channel 1 to channel 2, the data flow is allowed to continue over connection objects 514a and 518a through channel 2. If any data was backed up at the client side, that data is then allowed to flow through channel 2.

This process would then continue depending upon the policy set by the policy manager, and based upon the continual monitoring of each of the available channels by the channel monitor 522. For instance, a carlet may have more than one connection open as illustrated by connection object 514b, and connection object 518b of data multiplexer and flow controller 518c.

In certain circumstances, a connection object 518b may lose a connection 526 due to a break in the transmission capability of a particular channel (e.g., by going out of range of a current wireless network). If this were to occur, the detection of the unavailability of channel 4 (CH 4), would be identified by the channel monitor 522. The connection object 518b would then determine whether the channel that became unavailable was actually in use. In one example, the channel may not actually be in use, but its loss in availability would still be detected, thus preventing its selection. In another example, it is assumed that channel 4 was in use. In such a case, data may have been lost due to the sudden drop in communication. When this occurs, the connection object 518b would communicate with a connection object 514b of the carlet to determine if data was in fact lost. If data was lost, a request would be made to the carlet for the lost data in case the carlet was sending data to the server, or a request would be made to the server for the lost data in case the server was sending data to the carlet.

The policy manager would then be queried to determine which one of the remaining channels being monitored by the channel monitor 522 would be most preferable to switch to, to continue the connection established between connection objects 514b and 518b. In this example, the connection object 518b would switch to connection 526' over channel 5 (CH 5), which may be a slower connection, although, the connection would be transparently re-established to enable continual data transmission. To complete the switch, the synchronization control 527 would work in conjunction with the client side and the server side to ensure that data being communicated between each of the data multiplexer and flow controllers 518c and 518s is synchronized, and any dropped data is retransmitted. Because the channel monitor 522 continues to monitor each of the channels, if the more preferred channel were to come back on, a transparent switch would again occur, as discussed with reference to the channel switch between connections 524 and 524'. Although the message manager is shown utilizing the stream manager, other implementations may have a message manager utilizing its own protocol, and in some cases, its own hardware.

Figure 7:
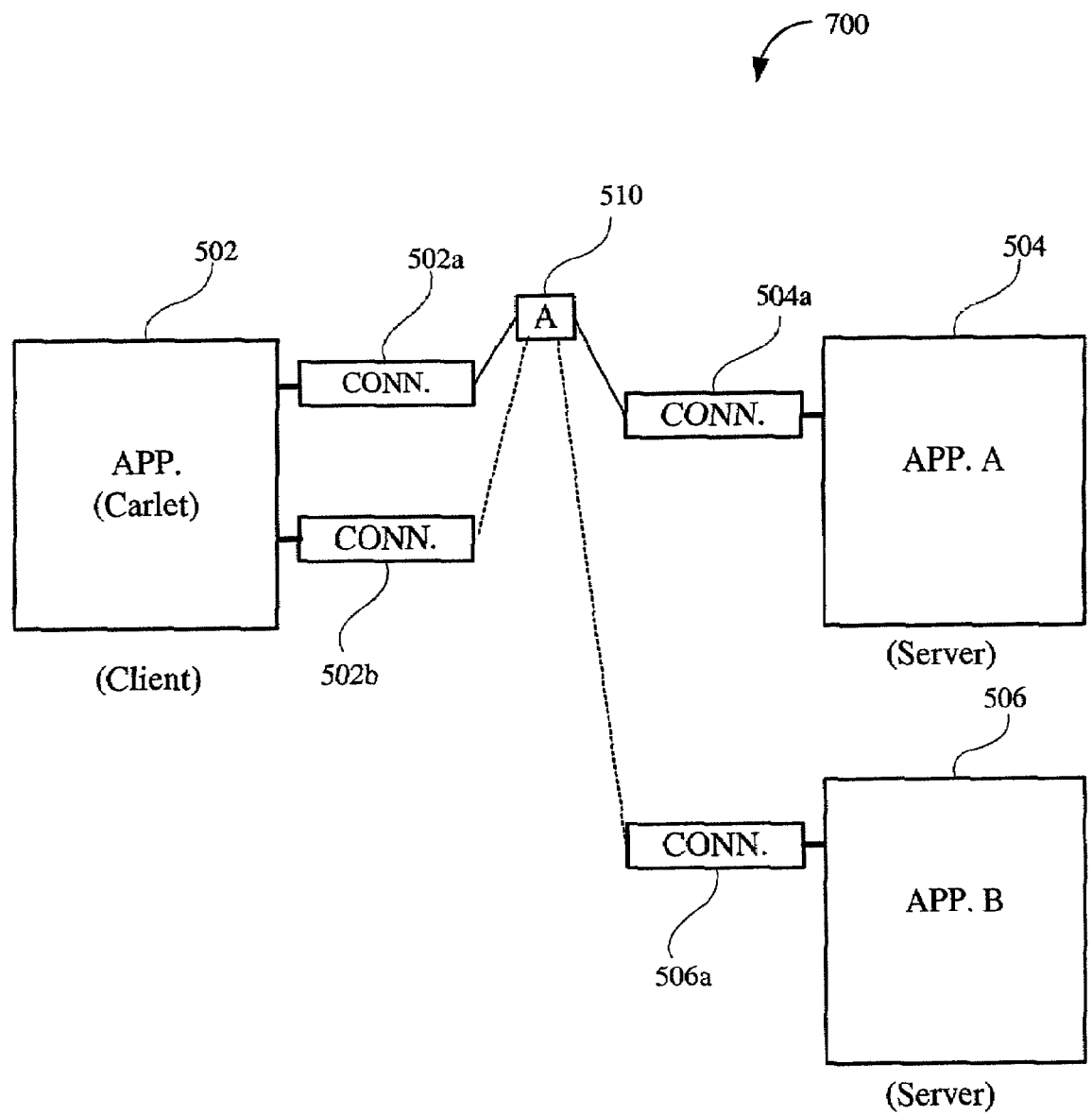
FIG. 7 is a connection diagram, illustrating the sharing of a channel A, in accordance with one embodiment of the present invention.

FIG. 7 is a connection diagram 700, illustrating the sharing of a channel A 510, in accordance with one embodiment of the present invention. Carlet 502 is shown having two separate connections (e.g., logical connections) 502a and 502b, each of which is transmitting over channel A. Connection 502a is linked with connection 504a to establish logical connection. Likewise, connection 502b is linked with connection 506a to establish another logical connection. In accordance with one embodiment of the present invention, each logical connection is enabled with a particular bandwidth or priority so that each connection can share channel A 510, and connections having more priority are given preference over lower priority connections. This intelligent bandwidth sharing is required as channel A 510 has limited bandwidth, and each connection is given a portion of that bandwidth depending on arbitration parameters set for each connection. As discussed below, a grouping mechanism is used to group connection together with other connections having the same assigned arbitration parameters. Such arbitration parameters can be updated, thus allowing dynamic changes to the bandwidth assigned to particular connections.

Figure 8:
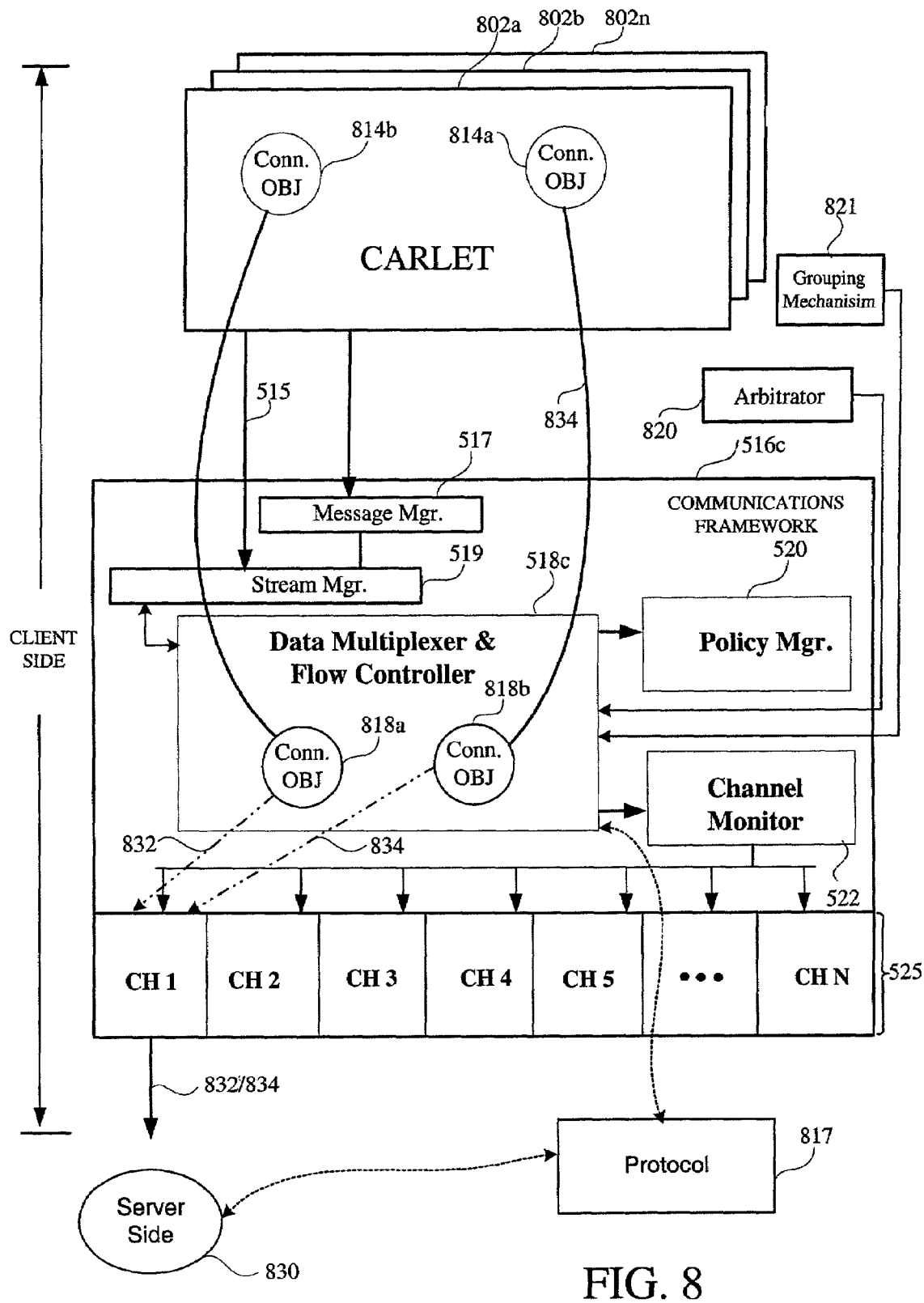
FIG. 8 illustrates another diagram of the client side in which carlets communicate with a communications framework, in accordance with one embodiment of the present invention.

FIG. 8 illustrates another diagram of the client side in which carlets 802 communicate with a communications framework 516c, in accordance with one embodiment of the present invention. As shown, a plurality of carlets 802 can communicate with the communications framework 516c of the client side to establish communication with a server side 830. For purposes of illustration, an example will be made with reference to carlet 802a, although a number of carlets such as carlets 802b-802n can also perform the same communication with the communications framework 516c. For instance, carlet 802a may request from the stream manager 519 that a connection be established for transmitting data to the server side 830.

The stream manager 519 will then communicate with the data multiplexer and flow controller 518c to request a connection. The connection 818a is then provided back to the carlet 802a to establish connection 832. In the same manner, a connection 818b is established between the carlet 802a and the communications framework 516c. Connection object 818b will thus communicate via connection 834. Connections 832 and 834 were both selected for channel 1 (CH 1). For instance, channel 1 may be a cell modem connection that is available to the carlet 802a for communication with a server side 830. In one example, channel 1 may be the only channel that is available for communication from the client side to the server side and therefore, both connection objects 818a and 818b will utilize the same channel 1.

In one embodiment, an arbitrator 820 will be in communication with the data multiplexer and flow controller 518c. The arbitrator 820 is charged with assigning, updating, and managing, for each connection object desiring communication over a particular channel, its associated bandwidth (e.g., arbitration parameters), or allotted communication bandwidth with the server side. A grouping mechanism 821 will, in one embodiment, assign each logical connection to a group that has particular arbitration parameters. The arbitration parameters will set the amount of bandwidth that may be allowed for connections that are resident or assigned to a particular group. For example, the arbitration parameters may be based upon priority, minimum bandwidth, minimum average bandwidth, or any other scheme that may be available to allocate the limited bandwidth of a particular channel among a number of connections desiring to transmit over the same communication channel.

As mentioned above, the data multiplexer and flow controller 518c will also be in communication with the policy manager 520, and the channel monitor 522. The channel monitor 522 may have indicated that the only channel that is available for transmission is channel 1. The policy manager 520 will thus allow or disallow connections over channel 1, depending upon the policy set for a particular connection between a carlet 802a and the server side 830. A protocol 817 is shown in communication with the data multiplexer and flow controller 518c, and the server side 830. The protocol 817 is charged with ensuring that both the client side and the server side are synchronized so that each will receive the same data in accordance with the arbitration parameter set for the connection objects.

The grouping mechanism 821 is configured to link or assign a particular connection to the arbitration parameters set for the particular group. In each particular group, the arbitration parameters can be set to provide connections that are part of that particular group with a given bandwidth policy. At any time, the arbitration parameters of a particular group can be updated so that connections that are part of a particular group can be processed with new arbitration parameters. For instance, a particular group may be given low priority because the carlet may simply be communicating music files between the server side and client side. At a later point in time, the user may want to give music downloading higher bandwidth, if a higher subscription fee is paid, for example. To accomplish this, the group for which the connection object is part of may be given new arbitration parameters to increase the bandwidth. During the next transmission, the new arbitration parameters will be used to allocate the bandwidth to the connection of the group which has now had an update.

As mentioned above, the data multiplexer and flow controller 518c will operate in time slices and will multiplex data from the logical connections to the channel in a packetized fashion using the protocol 817. In this manner, both the client side and the server side can keep track of each of the packetized transfers of data between the client and the server. If packets are dropped, packets can be resent. Exemplary protocols may be, for example, IP, TCP/IP, etc. The amount of data sent for a certain connection in a certain time slice may be determined by the group the connection is a member of, including the arbitration parameters set by the arbitrator 820, and the policy set by the policy manager 520.

Accordingly, arbitration will occur on an ongoing basis (e.g., every time slice), so that any change in the arbitration parameters for a certain connection will have an effect on the arbitration in the next time slice for that connection. Therefore, updates to the arbitration parameters will be dynamically updated in runtime so that data transfers for each of the connection objects can be managed depending upon changes in bandwidth need, priority, or the like.

Figure 9:
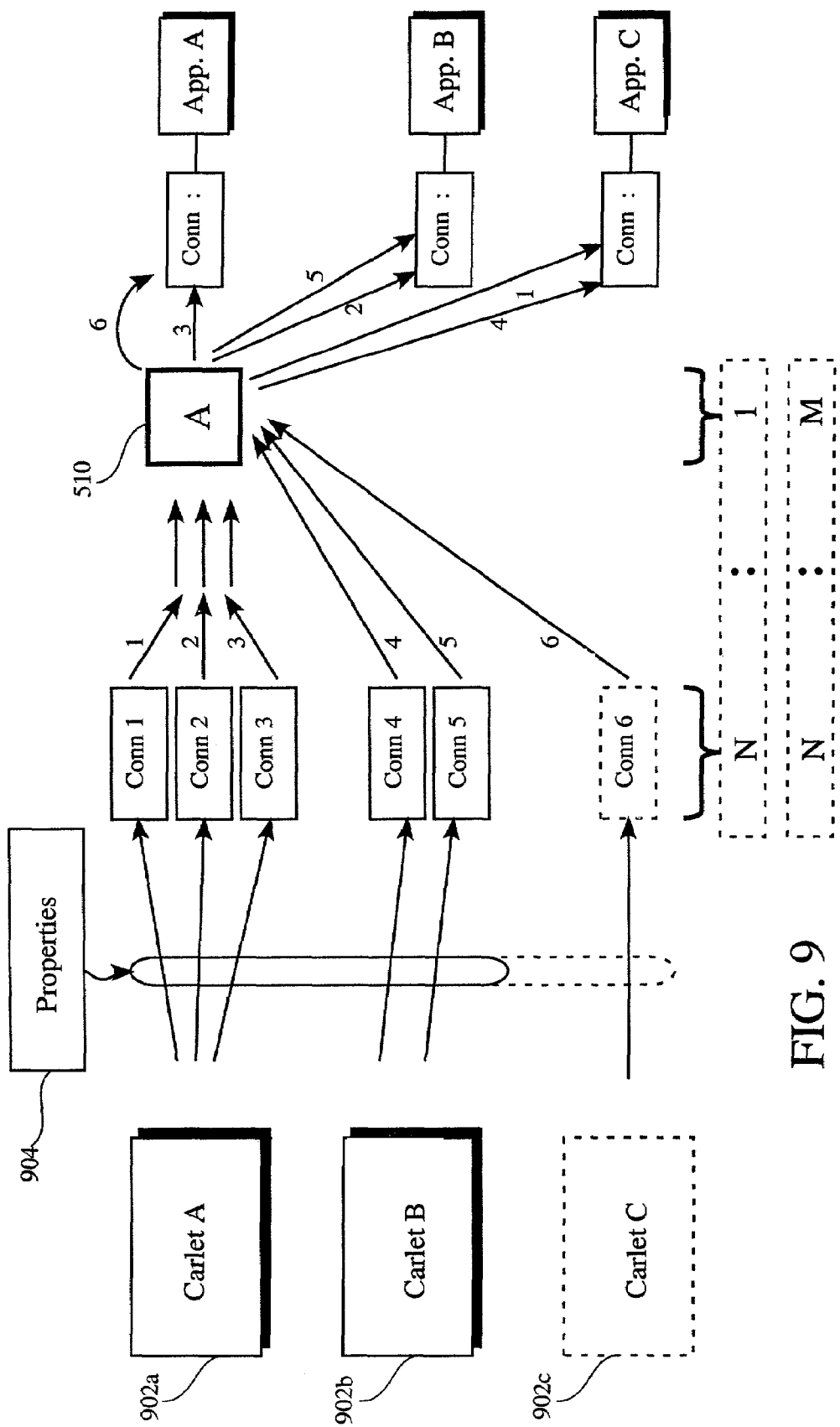
FIG. 9 illustrates a high level block diagram of a plurality of carlets, in communication with applications, in accordance with one embodiment of the present invention.

FIG. 9 illustrates a high level block diagram of a plurality of carlets 902a (carlet A), carlet 902b (carlet B), and carlet 902c (carlet C). The carlets 902 are shown in communication with applications A, B, and C. As shown, carlet A has established three logical connections (CONN 1, CONN 2, and CONN 3) with applications A, B and C over channel A 510. Carlet B has established two connections (CONN 4, and CONN 5) over channel A 510. Connection 4 and connection 5 are respectively routed to application C and application B, respectively. Each of the connections between the carlets 902 and the applications A, B and C, are established in accordance with properties 904.

Figure 10:
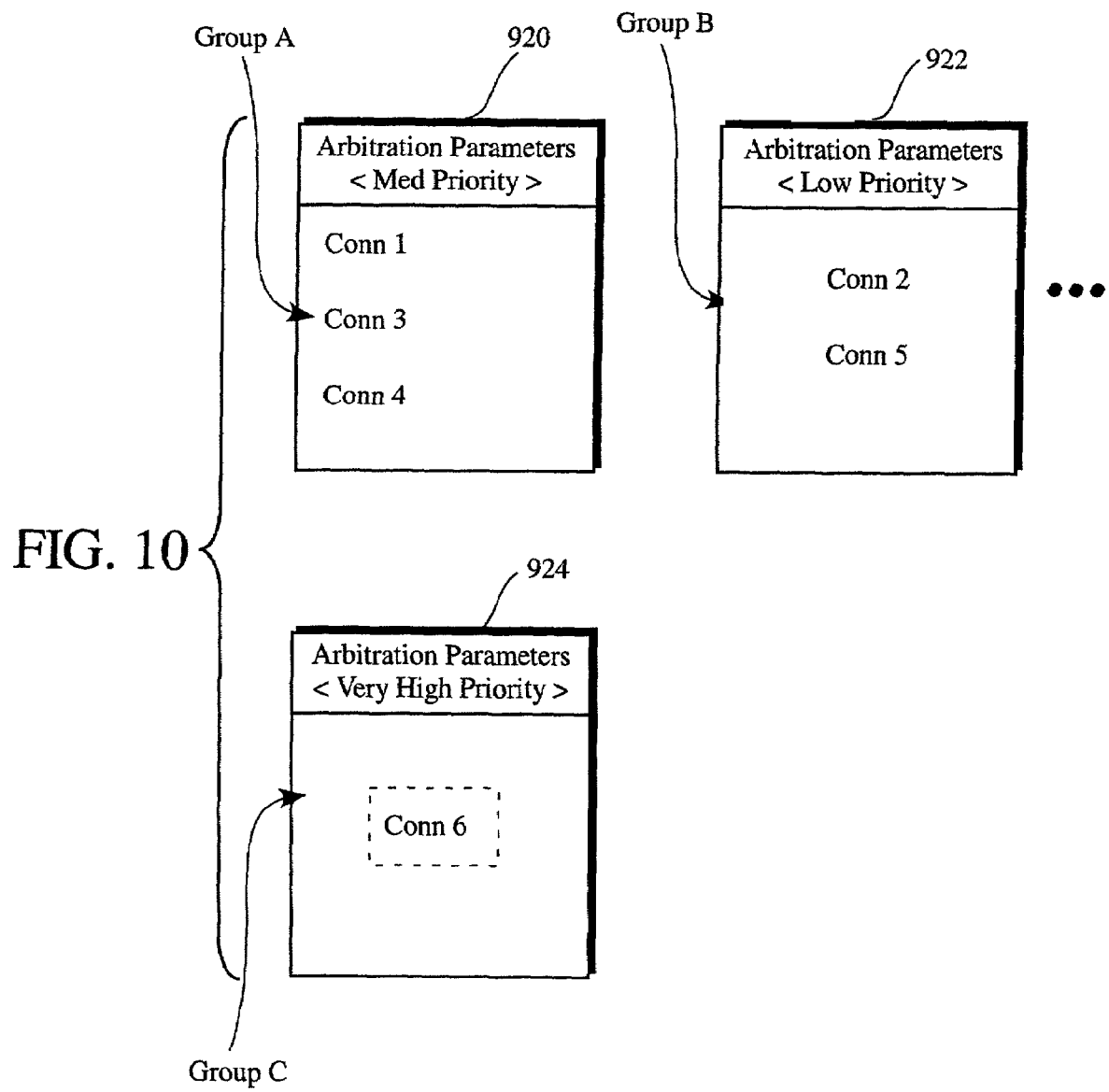
FIG. 10 illustrates exemplary groups having specific arbitration parameters, and associated connections that have been assigned to specific groups, in accordance with one embodiment of the present invention.

The properties 904 will determine what type of priority (i.e., arbitration parameters) each of the connections will be granted. In accordance with these properties 904, the arbitrator 820 will use a grouping mechanism to group each one of the connections between carlets and applications on a server side into groups. Each one of the groups will have an associated type of arbitration parameters. As shown in FIG. 10, group A, group B, and group C are each provided with a different type of arbitration parameter. In this example, group 920 will have arbitration parameters for medium priority and connections 1, 3, and 4 are assigned to group A. Connections 2 and 5 are associated with group B.

Referring again to FIG. 9, a carlet C 902c will require a connection 6 (CONN 6) having properties that define or request high priority. The properties of carlet C may be, for example, urgent communication for a 911 cell telephone call, communication of an accident, or communication of a major malfunction in the vehicle to a local service station or service provider, or any other type of high priority communication. The ranking of what gets higher priority is not important here, but what is important is the ability to assign different priorities and bandwidth in a dynamic fashion, at runtime, so that the telematics system can prioritize communications of the various carlet applications over particular communication channel(s).

Continuing with the example, connection 6 will also utilize channel A 510 and will require connection to application A. Assume that currently, carlet A is communicating over channel A 510 with application A over connection 3. As shown in FIG. 10, connection 3 is associated with medium priority in accordance with its grouping to A. Upon the establishment of connection 6, connection 6 is grouped with group C 924 in which the arbitration parameters are for very high priority. Accordingly, as connection 6 has higher priority than connection 3, and connection 6 has higher priority than any of connections 1, 4, 2 and 5, the bandwidth required by carlet C over channel A will be given priority over all of the connections utilizing channel A 510. The assigned bandwidth can also be defined by the arbitration parameters. FIG. 9 therefore illustrates a situation where there are N connections attempting to share one channel A. However, the same logic will apply to the situation where there are N connections attempting to share M channels.

Figure 11:
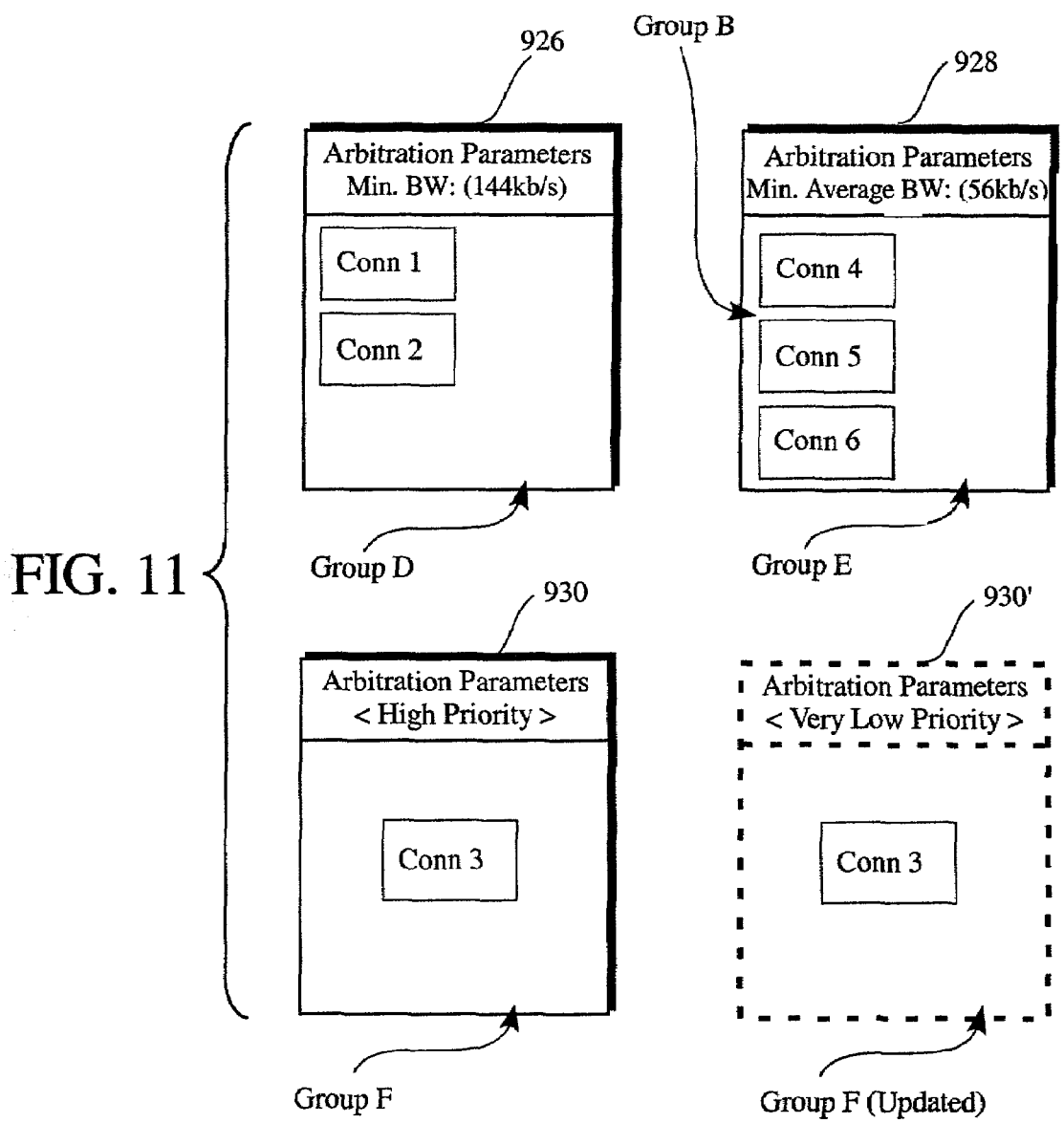
FIG. 11 illustrates yet another example in which the arbitration parameters can be specifically set for each group, such as groups D, group E, and group F, in accordance with one embodiment of the present invention.

FIG. 11 illustrates yet another example in which the arbitration parameters can be specifically set for each group, such as groups D, group E, and group F, in accordance with one embodiment of the present invention. As shown, group D 926 will have arbitration parameters of a minimum bandwidth of 144 Kb/s. Each of connections 1 and 2 may be made part of that group by the grouping mechanism. Group E is shown having arbitration parameters of a minimum average bandwidth of 56 Kb/s, and connections 4, 5, and 6 may be made part of group E 928. In the same manner, group F may be provided with simply high priority arbitration parameters that may trump all other arbitration parameters of other groups.

In one embodiment, the arbitration parameters of group F may be updated so that the high priority arbitration parameters are switched to very low priority as shown in group F 930'. Because data is preferably being transmitted between the client and the server in a packetized manner, and in each time slice, the arbitration parameters for a particular connection are checked, the arbitration parameter set in group F 930' will take precedent over the arbitration parameter set in group F 930 in the next time slice (or X number of packets later), or packetized transfer. It should be appreciated that the ability to update the arbitration parameters for a particular group enhance the ability of managing the use of particular channels between carlets (i.e., applications) on a client side and applications on the server side. In the space of a Java telematics system, the carlets are in communication with applications running on a Java Provisioning Server.

Figure 12:
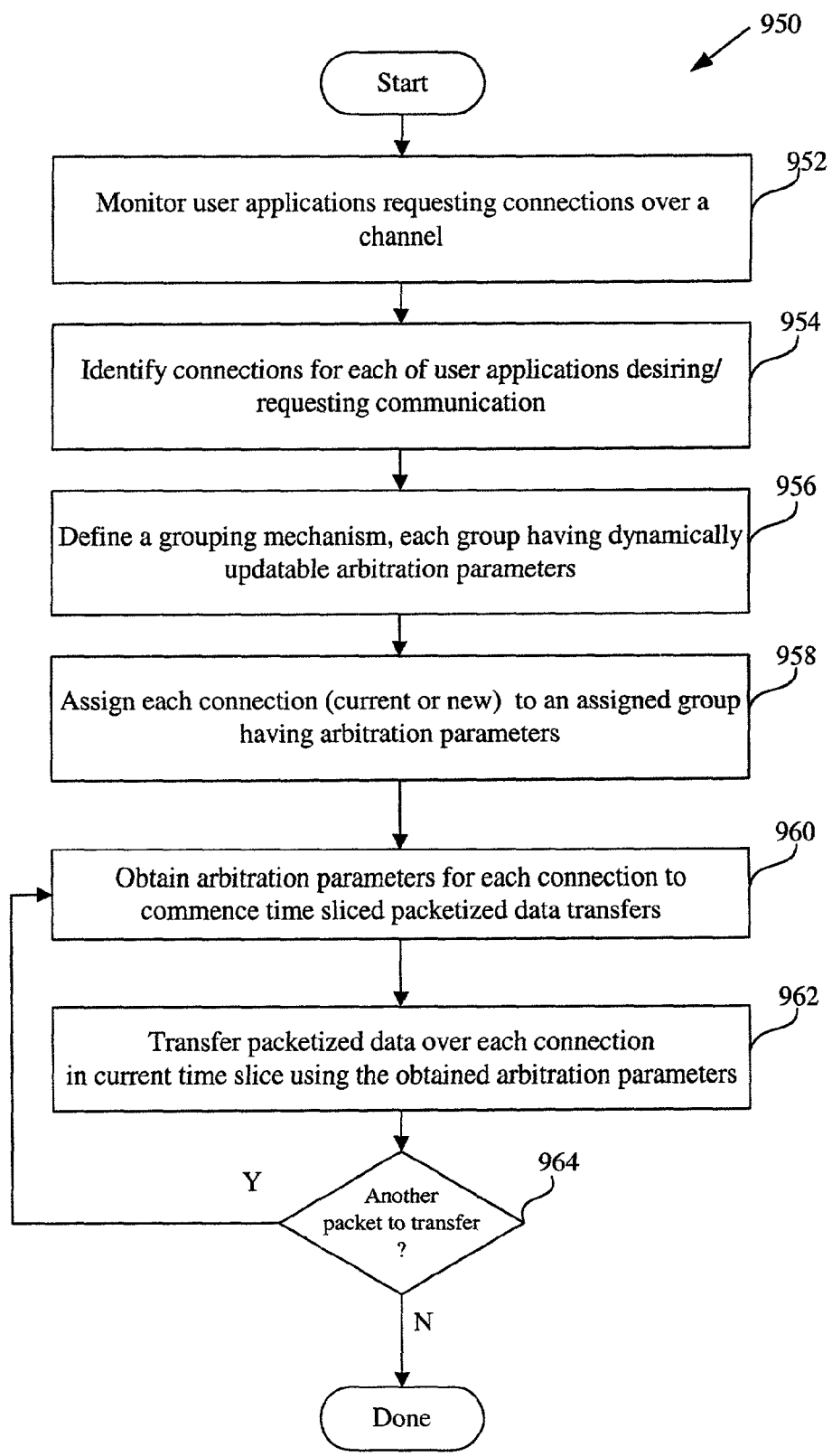
FIG. 12 illustrates a flowchart diagram defining exemplary bandwidth arbitration method operations, in accordance with one embodiment of the present invention.

FIG. 12 illustrates a flowchart diagram 950 defining exemplary method steps in accordance with one embodiment of the present invention. The method begins in operation 952 where user applications requesting connections over a channel are monitored. As described above, each one of the connections is preferably being monitored to assign it to a particular channel and to assign it to a particular group having assigned arbitration parameters. In operation 954, connections for each of the user applications desiring or requesting communication are identified. In operation 956, each group having dynamically updateable arbitration parameters is defined by the grouping mechanism.

The grouping mechanism may create groups on the fly, or may have predetermined group types in which connections will be associated to. The method now moves to operation 958 where each connection, whether it is a current connection or a new connection, is assigned to a group (new or existing) having arbitration parameters that match or are associated with the type of connection being created or continued (e.g., depending on the properties of the requested connection). Now, the method moves the operation 960 in which arbitration parameters for each connection to be transmitted in a time slice packetized form are obtained. In this manner, during each time slice, the arbitration parameters for the particular connection are looked up to ensure that the packetized data transfer for that particular connection in that particular time slice is being transmitted in accordance with the arbitration parameter set by the application or user. Now, the method moves to operation 962 where the packetized data is transferred over each connection in the current time slice, using the obtained arbitration parameters.

The method now moves to operation 964 where it is determined if there is another packet to transfer. If there are no more packets to transfer, the method will be done. If there are more packets to transfer, the method will move back to operation 960 where the arbitration parameters for each connection to be commenced are obtained so that the transfer will occur in accordance with the arbitration parameters set for the particular connection at that time. The method then again cycles through operation 962 and 964, and back to 960 until all data has been transferred for connections desiring to transfer data between the client side and the server side.

As used herein a carlet is a Java application. For each function or task to be processed on the client side or between the client and server sides, a carlet is invoked to manage the operation. In this manner, carlets can be independently written, tested, and launched for use on a telematics system. By way of example, a carlet can be written to control or monitor the activity of automobile components (e.g., tires, engine oil, wiper activity, steering tightness, maintenance recommendations, air bag control, transmission control, etc.). A carlet can be written to control or monitor applications to be processed by the telematics control unit (TCU) and interacted with using the on-board automobile monitor. As such, specialized carlets can be written to control the audio system, entertainment modules, such as on line games or movies, voice recognition, telecommunications, email communications (text and voice driven), etc. Accordingly, the type of carlets that can be written is unlimited. Carlets may be pre-installed or downloaded from a server. A carlet may or may not have an API which may be invoked by other carlets. The carlet may or may not have running threads of its own.

In practice, system carlets most likely will be written by the automobile manufacturer, who will be most knowledgeable of critical vehicle component operation, while non-vehicle system carlets can be written by independent software companies. Each carlet may therefore, in one embodiment, be associated with a set of properties. These properties, among other things, will dictate what minimum level of bandwidth should be provided by the communications framework.

As an overview, the Java virtual machine (JVM) is used as an interpreter to provide portability to Java applications. In general, developers design Java applications as hardware independent software modules, which are executed by Java virtual machines. The Java virtual machine layer is developed to operate in conjunction with the native operating system of the particular hardware on which the communications framework 516c is to run. In this manner, Java applications (e.g., carlets) can be ported from one hardware device to another without requiring updating of the application code.

Unlike most programming languages, in which a program is compiled into machine-dependent, executable program code, Java classes are compiled into machine independent byte-code class files which are executed by a machine-dependent virtual machine. The virtual machine provides a level of abstraction between the machine independence of the byte-code classes and the machine-dependent instruction set of the underlying computer hardware. A class loader is responsible for loading the byte-code class files as needed, and an interpreter or just-in-time compiler provides for the transformation of byte-codes into machine code.

More specifically, Java is a programming language designed to generate applications that can run on all hardware platforms, small, medium and large, without modification. Developed by Sun, Java has been promoted and geared heavily for the Web, both for public Web sites and intranets. Generally, Java programs can be called from within HTML documents or launched standalone. When a Java program runs from a Web page, it is called a "Java applet," and when run on a Web server, the application is called a "servlet."

Java is an interpreted language. The source code of a Java program is compiled into an intermediate language called "bytecode". The bytecode is then converted (interpreted) into machine code at runtime. Upon finding a Java applet, the Web browser invokes a Java interpreter (Java Virtual Machine), which translates the bytecode into machine code and runs it. Thus, Java programs are not dependent on any specific hardware and will run in any computer with the Java Virtual Machine software. On the server side, Java programs can also be compiled into machine language for faster performance. However a compiled Java program loses hardware independence as a result.

Although the present invention is described based on the Java programming language, other programming languages may be used to implement the embodiments of the present invention, such as other object oriented programming languages. Object-oriented programming is a method of creating computer programs by combining certain fundamental building blocks, and creating relationships among and between the building blocks. The building blocks in object-oriented programming systems are called "objects." An object is a programming unit that groups together a data structure (instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction to the object to execute a certain method. It consists of a method selection (name) and a plurality of arguments that are sent to an object. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. A class defines a type of object that typically includes both instance variables and methods for the class. An object class is used to create a particular instance of an object. An instance of an object class includes the variables and methods defined for the class. Multiple instances of the same class can be created from an object class. Each instance that is created from the object class is said to be of the same type or class.

A hierarchy of classes can be defined such that an object class definition has one or more subclasses. A subclass inherits its parent's (and grandparent's etc.) definition. Each subclass in the hierarchy may add to or modify the behavior specified by its parent class.

To illustrate, an employee object class can include "name" and "salary" instance variables and a "set_salary" method.

Instances of the employee object class can be created, or instantiated for each employee in an organization. Each object instance is said to be of type "employee." Each employee object instance includes the "name" and "salary" instance variables and the "set_salary" method. The values associated with the "name" and "salary" variables in each employee object instance contain the name and salary of an employee in the organization. A message can be sent to an employee's employee object instance to invoke the "set_salary" method to modify the employee's salary (i.e., the value associated with the "salary" variable in the employee's employee object).

An object is a generic term that is used in the object-oriented programming environment to refer to a module that contains related code and variables. A software application can be written using an object-oriented programming language whereby the program's functionality is implemented using objects. Examples of object-oriented programming languages include C++ as well as Java.

Furthermore the invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, such as the TCU discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. The embodiments of the present invention are not limited to vehicle telematics applications, but to the contrary are applicable to all types of "mobile stations" (e.g., vehicles, cell phones, PDAs, laptops, mobile computing devices, etc.), which can intelligently and opportunistically exploit multiple asymmetric communications channels. Accordingly, the present embodiments are to be considered as illustrative and not restrictive, and the invention is not to be limited to the details given herein, but may be modified within the scope and equivalents of the appended claims.

What is claimed is:

1. A method for arbitrating channel bandwidth among a plurality of logical connections desiring access over a communication channel to transmit data, comprising:
   detecting a connection desiring access through the communication channel;
   assigning the connection to a group having arbitration parameters, wherein the arbitration parameters are dynamically updateable in runtime;
   packetizing the data to be transmitted; and
   transmitting each packet of the data in time slices, in each time slice, using the dynamically updated arbitration parameters currently assigned to the group,
   wherein the arbitration parameters are configured to dynamically change for each packet transmission of a time slice enabling efficient management of available channel bandwidth.

2. A method for arbitrating channel bandwidth among a plurality of logical connections desiring access over a communication channel to transmit data as recited in claim 1, further comprising:
   updating the arbitration parameters; and
   transmitting a next packet in a next time slice using the updated arbitration parameters.

3. A method for arbitrating channel bandwidth among a plurality of logical connections desiring access over a communication channel to transmit data as recited in claim 1, wherein the communication channel has a defined bandwidth.

4. A method for arbitrating channel bandwidth among a plurality of logical connections desiring access over a communication channel to transmit data as recited in claim 1, further comprising:
   detecting additional connections desiring access through the communication channel;
   assigning each connection to the group or additional groups, each group having defined arbitration parameters, and continuing to transmit each packet of the data in time slices, and in each time slice using the arbitration parameters assigned to the group in which the connection is a member.

5. A method for arbitrating channel bandwidth among a plurality of logical connections desiring access over a communication channel to transmit data as recited in claim 1, wherein the arbitration parameters define one of an allocated bandwidth and an assigned priority.

6. A method for arbitrating channel bandwidth among a plurality of logical connections desiring access over a communication channel to transmit data as recited in claim 5, wherein each of the allocated bandwidth and the assigned priority are updateable for each group.

7. A method for arbitrating channel bandwidth among a plurality of logical connections desiring access over a communication channel to transmit data as recited in claim 1, wherein the connection is between a client application and a server application.

8. A method for arbitrating channel bandwidth among a plurality of logical connections desiring access over a communication channel to transmit data as recited in claim 1, wherein the client application is a carlet of a telematics client, and the server application is an application of a telematics provisioning server.

9. A system for arbitrating channel bandwidth among a plurality of logical connections desiring access over a communication channel to transmit data, comprising:
  a grouping mechanism for creating connection groups, each connection group having specific arbitration parameters;
  an arbitrator for managing the arbitration parameters of each connection group, the arbitration parameters being dynamically updateable in runtime; and
  a data multiplexer and flow controller for transmitting the data, the transmitting includes packetizing the data and sending packets in time slices, and for each connection and in each time slice, using the specific dynamically updated arbitration parameters currently assigned to the connection group of the connections,
  wherein the arbitration parameters are configured to dynamically change for each packet transmission of a time slice enabling efficient management of available channel bandwidth.

10. A system for arbitrating channel bandwidth among a plurality of logical connections desiring access over a communication channel to transmit data as recited in claim 9, further comprising:
  a stream manager for initiating a logical connection between a client application and a server application over the communications channel.

11. A system for arbitrating channel bandwidth among a plurality of logical connections desiring access over a communication channel to transmit data as recited in claim 10, further comprising:
  a protocol for synchronizing arbitrated bandwidth between the client application and the server application.

12. A system for arbitrating channel bandwidth among a plurality of logical connections desiring access over a communication channel to transmit data as recited in claim 9, wherein an update in the arbitration parameters causes a change in the handling of a next packet of data in a next time slice at runtime.

13. A system for arbitrating channel bandwidth among a plurality of logical connections desiring access over a communication channel to transmit data as recited in claim 10, wherein the system for arbitrating channel bandwidth is part of a telematics client framework.

14. A system for arbitrating channel bandwidth among a plurality of logical connections desiring access over a communication channel to transmit data as recited in claim 13, wherein the telematics client framework processes for the client application and communicates with a telematics provisioning server that processes the server application.

15. A computer readable media in which program instructions are stored, which instructions, when read by a computing system, cause the computing system to perform a method for arbitrating channel bandwidth among a plurality of logical connections desiring access over a communication channel to transmit data, the method comprising:
  creating connection groups, each connection group having specific arbitration parameters;
  managing the arbitration parameters of each connection group, the arbitration parameters being dynamically updateable in runtime; and
  transmitting the data, the transmitting includes packetizing the data and sending packets in time slices, and for each connection and in each time slice, using the specific dynamically updated arbitration parameters currently assigned to the connection group of the connection,
  wherein the arbitration parameters are configured to dynamically change for each packet transmission of a time slice enabling efficient management of available channel bandwidth.

16. The computer readable media as recited in claim 15, further comprising:
  initiating a logical connection between a client application and a server application over the communications channel.

17. The computer readable media as recited in claim 16, further comprising:
  synchronizing arbitrated bandwidth between the client application and the server application.

18. Computer readable media as recited in claim 15, wherein an update in the arbitration parameters causes a change in the handling of a next packet of data in a next time slice at runtime.

19. A method for arbitrating channel bandwidth among a plurality of logical connections desiring access over a communication channel to transmit data, the method comprising:
  creating connection groups, each connection group having specific arbitration parameters;
  managing the arbitration parameters of each connection group, the arbitration parameters being dynamically updateable in runtime; and
  transmitting the data, the transmitting includes packetizing the data and sending packets in time slices, and for each connection and in each time slice, using the specific dynamically updated arbitration parameters currently assigned to the connection group of the connection,
  wherein the arbitration parameters are configured to dynamically change for each packet transmission of a time slice enabling efficient management of available channel bandwidth.

20. A method as recited in claim 19, further comprising:
  synchronizing arbitrated bandwidth between the client application and the server application.

21. A method as recited in claim 19, wherein an update in the arbitration parameters causes a change in the handling of a next packet of data in a next time slice at runtime.

* * * * *